(12) United States Patent
Yun et al.

(10) Patent No.: US 7,177,357 B2
(45) Date of Patent: *Feb. 13, 2007

(54) DATA PROCESSING SYSTEM FOR STEREOSCOPIC 3-DIMENSIONAL VIDEO BASED ON MPEG-4 AND METHOD THEREOF

(75) Inventors: Kugjin Yun, Daejeon (KR); Sukhee Cho, Daejeon (KR); Yunjung Choi, Daejeon (KR); Jinhwan Lee, Daejeon (KR); Youngkwon Hahm, Daejeon (KR); Chieteuk Ahn, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 716 days.

This patent is subject to a terminal disclaimer.

(21) Appl. No.: 10/404,608

(22) Filed: Apr. 1, 2003

(65) Prior Publication Data

US 2004/0066846 A1    Apr. 8, 2004

(30) Foreign Application Priority Data

Oct. 7, 2002    (KR) ............... 10-2002-0060987

(51) Int. Cl.
    *H04N 7/12*    (2006.01)
    *H04J 3/04*    (2006.01)
(52) U.S. Cl. .................... 375/240.01; 375/535

(58) Field of Classification Search .......... 375/240.01, 375/240.25; 348/423.1, 424.1, 51; 370/537, 370/535; 345/204
See application file for complete search history.

(56) References Cited

U.S. PATENT DOCUMENTS

| 5,886,736 | A  | * | 3/1999 | Chen ........................... 348/43 |
| 6,567,427 | B1 | * | 5/2003 | Suzuki et al. ............... 370/535 |
| 6,754,239 | B2 | * | 6/2004 | Negishi et al. ............. 370/537 |
| 2002/0030675 | A1 | * | 3/2002 | Kawai ........................ 345/204 |
| 2003/0095177 | A1 | * | 5/2003 | Yun et al. .................... 348/42 |
| 2004/0120396 | A1 | * | 6/2004 | Yun et al. .............. 375/240.01 |

* cited by examiner

*Primary Examiner*—Gims Philippe
(74) *Attorney, Agent, or Firm*—Blakely Sokoloff Taylor & Zafman

(57) ABSTRACT

A data processing system and method for stereoscopic 3D video based on MPEG-4. Various elementary streams of left and right images of stereoscopic 3D video are multiplexed into a single stream, and efficient buffer management is performed through field encoding that supports possible display methods. The system minimizes the synchronization time of left and right images and reduces the complexity of the decoder model. Also, a decoding buffer size is allocated to enable support of stereoscopic 3D video field/frame shuttering and stereoscopic 3D video polarized display, while maintaining compatibility with conventional 2D video data processing. Finally, only DTS and CTS are transmitted at the same time, and DTS and CTS of the remaining times are estimated to thereby simplify synchronization.

23 Claims, 6 Drawing Sheets

DATA PROCESSING SYSTEM FOR STEREOSCOPIC 3-DIMENSIONAL VIDEO BASED ON MPEG-4 AND METHOD THEREOF

BACKGROUND OF THE INVENTION (a) Field of the Invention

The present invention relates to a data processing system for stereoscopic 3-dimensional video based on MPEG-4 and a method thereof. More particularly, the present invention relates to a data processing system for stereoscopic 3-dimensional video based on MPEG-4 and a method thereof, in which the system and method has the added ability of being able to synchronize stereoscopic 3-dimensional video data.

(b) Description of the Related Art

MPEG-4 is a standard that includes streaming of an elementary stream that is encoded according to object, synchronization of an elementary stream, and elementary stream management for managing the relation and position between each elementary stream and information for specific applications.

Elementary stream data are divided into access units (AUs), which are the smallest units that can have timing information, and AUs located at the same time position with respect to an elementary stream are decoded by one DTS (decoding time stamp) and CTS (composition time stamp). Time stamps such as the DTS and CTS are used to precisely display a decoding point of AUs in a decoding buffer of a receiving terminal (DTS), or a point for performing composition of CUs (composition units) in a composition memory.

To satisfy the standards of the MPEG-4 system, a new system decoder model (SDM) was defined, and a flexmux for supplementing a conventional transmitting medium function and a synchronization layer for adjusting time synchronization were newly introduced.

Stereoscopic 3-dimensional video are able to realize various display such as 2-dimensional video display, 3-dimensional field shuttering display, 3-dimensional frame shuttering display, stereoscopic video, and stereoscopic 3-dimensional polarized display, and video data and synchronization information are different depending on each display type.

The MPEG-4 system is designated for 2D (2-dimensional) multimedia data processing and display. Standardization has only taken place with respect to buffer management and a timing model for 2D video display.

However, with respect to stereoscopic 3-dimensional video that include left and right images, in order to maintain compatibility with the MPEG-4 system and realize effective synchronization between left and right images, there are needed buffer management and timing management methods that estimate DTS and CTS information with respect to AUs of the remaining channels that vary according to the different display types described above using DTS and CTS information with respect to an AU of one channel, thereby reducing a synchronization time and complication of a decoding model of the left and right images.

Figure 1:
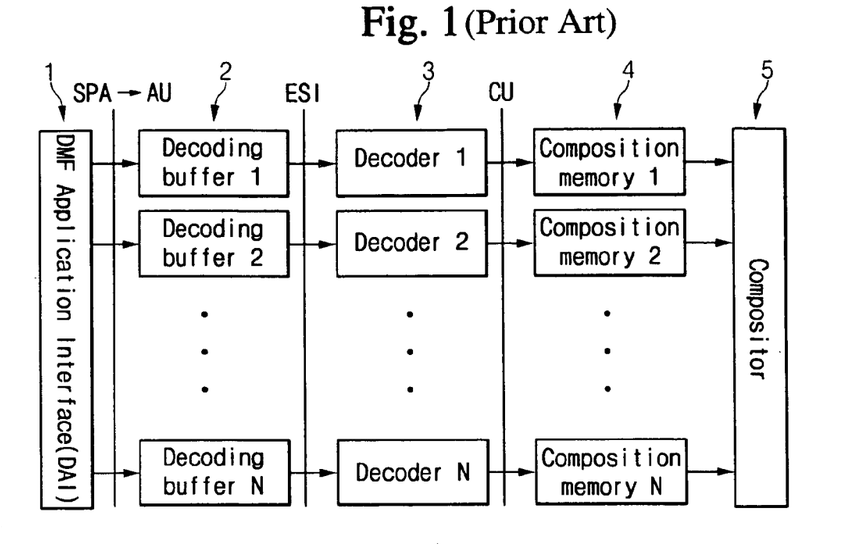
FIG. 1 is a drawing showing a decoder model of a conventional MPEG-4 system.

FIG. 1 is a drawing showing a decoder model of a conventional MPEG-4 system.

As shown in the drawing, the decoder model for the conventional MPEG-4 system includes a DAI (DMIF-application interface) 1, a decoding buffer 2, a decoder 3, a composition memory 4, and a compositor 5. The DMIF is divided into a control plane and a user plane, which are designated with respect to a delivery layer of the MPEG-4.

The control plane of the DMIF manages sessions and acts to send and receive messages between peers, while the user plane mainly performs the sending and receiving of data.

The DMIF designates interfaces into two layers of DAI and DMIF network interface (DNI). DAI is an interface provided to DMIF application programmers, and DNI is used within the DMIF and performs work of mapping DMIF signaling (DS) messages, which is a protocol defined between peers, and transmitting the same.

The DAI 1 includes a demultiplexer, and provides access with respect to streaming data input to the decoding buffer 2. At this time, streaming data received through the DAI 1 are structured using SPS. Each SPS is structured in a chain of packets that include one elementary stream. Each packet includes elementary stream data divided into AUs, timing with respect to each AU, and other additional information. An SPS data payload is input to the decoding buffer 2. The additional information is removed at an input terminal of the decoding buffer 2.

AUs are the smallest units that can have timing information. Explanation information with respect to each AU is determined in an encoding step. The AUs are transmitted by the SPSs for input to the decoding buffer 2. The decoding buffer 2 is used to store AUs used in the decoder 3. A buffer amount required by the decoding buffer 2 is already known in a transmitting end, and information with respect to a buffer amount of the decoding buffer 2 is known in a receiving end. However, in the case where, depending on the application, there is already a predetermined value of the buffer amount of the decoding buffer 2, the predetermined buffer amount is used in the transmitting end.

The decoder 3 receives the AUs from the decoding buffer 2 precisely at a designated time, and performs decoding of the AUs. CUs resulting from the decoding operation are then output to the composition memory 4. As a result, the composition memory 4 stores the CUs. A size of the composition memory 4 does not need to be separately designated in the specifications of the MPEG-4 system.

The compositor 5 receives CUs from the composition memory 4, and performs composition or presentation in the case where the CUs are AV (audio/video) data, and performs a skip operation if the CUs are not AV data.

Figure 2:
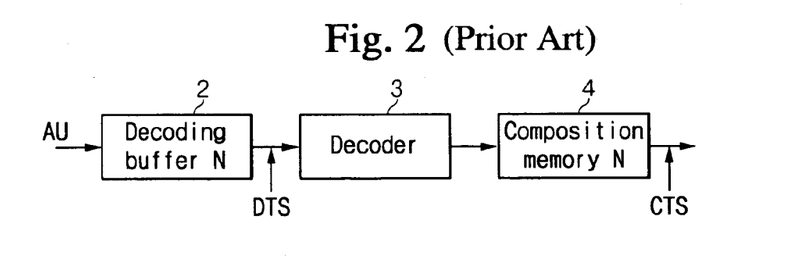
FIG. 2 shows a timing model for a conventional MPEG-4 system.

FIG. 2 shows a timing model for a conventional MPEG-4 system.

As shown in FIG. 2, in the timing model of the conventional MPEG-4 system, a standard clock or a time stream is used to synchronize AV data transmitted by elementary stream data.

The time samples DTS and CTS are used to precisely indicate points at which the AUs in the decoding buffer 2 are decoded, and points at which the CUs in the composition memory 4 undergo composition. Accordingly, the time stamps are related to the AUs and the CUs.

First, the DTS designates a decoding time with respect to each AU, and AUs corresponding to decoding times must exist in the decoding buffer 2. At this time, decoding with respect to the AUs is performed at the instant of the times designated by the DTS.

Next, the CTS designates a CTS with respect to each CU. The CUs corresponding to the CTSs must exist in the composition memory 4. Further, a present CU must be able to be used by the compositor 5 in a predetermined interval of time existing between a corresponding CTS and a subsequent CTS of a CU.

Figure 3:
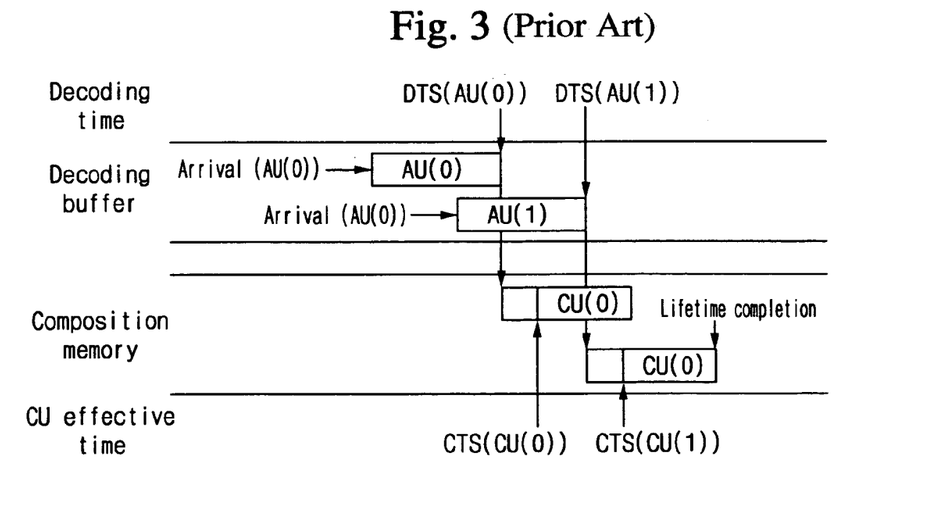
FIG. 3 is a drawing showing a buffer model of a conventional MPEG-4 system.

FIG. 3 is a drawing showing a buffer model of a conventional MPEG-4 system.

With reference to FIG. 3, the buffer model of a conventional MPEG-4 system shows a buffer operation of the decoding buffer 2. Buffer management is performed on the basis of DTS and CTS to prevent an overflow and underflow of the AUs and CUs.

AU buffering is managed by DTS, and decoding is performed by immediate conversion into CU at the time of DTS. At this time, in the case where it is known a predetermined time interval between consecutive AUs exists, the decoding time is temporarily known, and when this is not the case, the decoding time is known by the DTS of a packet header. Further, in the case where it is known a predetermined time interval between consecutive CUs exists, the CTS is temporarily known, and when this is not the case, the CTS is known by the CTS of a packet header.

Accordingly, the MPEG-4 system outputs elementary streams output from a plurality of encoders to each SPS via synchronization layers to adjust time synchronization. As a result, each SPS is structured in consecutive packets containing one elementary stream. These packets include elementary streams, which are divided into access units (AUs), which are the smallest units that can have timing information as described above, and also include timing and other additional information with respect to each AU.

An SPS data payload is input to the decoding buffer 2 of the system decoder model. At this time, additional information is removed in an input terminal of the decoding buffer 2. The decoding buffer 2 is used to store AUs required in the corresponding elementary stream decoder 3.

The decoder 3 receives the input of AUs from the decoding buffer 2 precisely at designated times to perform decoding. The generated CUs are then output to the composition memory 4. At this time, time stamps such as the DTS and CTS are used to indicate the times when AUs in the decoding buffer 2 are decoded and times when CUs in the composition memory 4 undergo composition.

However, since time models and system decoder models in the structure of MPEG-4 systems are limited to performing a standardization process on 2D multimedia data, there have not yet been disclosed buffer management methods and timing models for supporting stereoscopic 3-dimensional video processing and various display methods thereof.

SUMMARY OF THE INVENTION

It is one object of the present invention to provide a data processing system for stereoscopic 3-dimensional video based on MPEG-4 and a method thereof, in which the system and method, while maintaining compatibility with conventional MPEG-4 systems, designate buffer management and a timing model that are able to process data according to display methods able to use stereoscopic 3-dimensional video.

In one embodiment, the present invention provides a data processing system for stereoscopic 3-dimensional video based on MPEG-4, the system including a decoding buffer which, if external stereoscopic 3-dimensional video are input, performs multiplexing of only elementary streams required for a desired display method from among various display methods such as a 2-dimensional video display method, a stereoscopic 3-dimensional video field shuttering display method, a stereoscopic 3-dimensional video frame shuttering display method, and a stereoscopic 3-dimensional polarized display method, and storing stream data of 3-dimensional access units (3D_AUs) of a single channel; a decoder for decoding the stream data stored in the decoding buffer at decoding times designated with respect to each access unit (AU), and transporting the fields of left and right images following re-structuring as data in a single frame composition unit (CU) format; and composition memory storing the data of the composition unit format transmitted to the decoder.

The 3-dimensional access unit (3D_AU) stream data are formed of consecutive sync packets including a single elementary stream, and a sync packet header portion includes time information of a DTS (decoding time stamp) and a CTS (composition time stamp) with respect to AUs of a single channel according to the display method, and the time information of 3D_AU stream data has one CTS as a result of performing synchronization with respect to one frame among left and right frame images.

The decoding buffer, for 2D video display, stores stream data of 3D_AU formed of elementary streams with respect to odd and even fields of left images.

The decoding buffer, for 3D video field shuttering display, stores stream data of 3D_AU formed of elementary streams with respect to odd fields of left images and even fields of right images, and of elementary streams with respect to even fields of left images and odd fields of right images.

The decoding buffer, for 3D video shuttering display and stereoscopic 3D video polarized display, stores stream data of 3D_AU formed of odd and even fields of left images and odd and even fields of right images.

The composition memory, for 2D video display, stores images that include odd and even fields of left images restored by the decoder and inserted into individual lines.

The composition memory, for stereoscopic 3D video field shuttering display, stores images of a mixture of left and right images by inserting into individual lines odd fields of restored left images and even fields of right images, and even fields of left images and odd fields of right images.

The composition memory, for stereoscopic 3D video frame shuttering display or stereoscopic 3D video polarized display, stores images including odd and even fields of left images inserted into individual lines, and images including odd and even fields of right images inserted into individual lines.

The data processing method for stereoscopic 3-dimensional video based on MPEG-4 includes (a) performing multiplexing, in the case where external stereoscopic 3-dimensional video are input, of only elementary streams required for a desired display type from among various display methods such as a 2-dimensional video display method, a stereoscopic 3-dimensional video field shuttering display method, a stereoscopic 3-dimensional video frame shuttering display method, and a stereoscopic 3-dimensional polarized display method, and storing stream data of 3-dimensional access units (3D_AUs) of a single channel; (b) decoding the stream data stored in (a) at decoding times designated with respect to each access unit (AU), and transporting the fields of left and right images following re-structuring as data in a single frame composition unit (CU) format; and (c) storing the data of the composition unit format transmitted in (b).

The 3-dimensional access unit (3D_AU) stream data in step (b) are formed of consecutive sync packets including a single elementary stream, and a sync packet header portion includes time information of a DTS (decoding time stamp) and a CTS (composition time stamp) with respect to AUs of a single channel according to the display method, and the time information of 3D_AU stream data has one CTS as a result of performing synchronization with respect to one frame among left and right frame images.

If the user requests stereoscopic video display with respect to stereoscopic 3D video data in step (b), only an odd field elementary stream of 3D left images and an even field elementary stream of 3D left images output in step (a) are consecutively combined to realize stream data of 3D_AU of a single channel.

If the user requests stereoscopic 3D video field shuttering display with respect to stereoscopic 3D video data in step (b), only an odd field elementary stream of 3D left images and an even field elementary stream of 3D right images output in step (a) are consecutively combined to realize stream data of 3D_AU of a single channel.

If the user requests stereoscopic 3D video frame shuttering display or stereoscopic 3D video polarized display with respect to stereoscopic 3D video data in step (b), only an odd field and even field elementary stream of 3D left images, and an odd field and even field elementary stream of 3D right images output in step (a) are consecutively combined to realize stream data of 3D_AU of a single channel.

If the user requests stereoscopic video display with respect to stereoscopic 3D video in step (c), the method further includes (i) matching 3D_AU stream data with a DTS time in a sync packet header portion to restore odd fields and even fields of left images; and (ii) inserting the odd fields and even fields of left images restored in step (i) into individual lines to perform decoding into data of composition units restored into single frame images of a progressive scanning method.

If the user requests stereoscopic 3D video field shuttering display with respect to stereoscopic 3D video in step (c), the method further includes (i) matching 3D_AU stream data with a DTS time in a sync packet header portion to restore odd fields of left images and even fields of right images; and (ii) inserting the odd fields of left images and even fields of right images restored in step (i) into individual lines to perform decoding into data of composition units restored into single frame images of a progressive scanning method.

In the above, the time information of 3D_AU stream data has the same CTS with respect to left and right field images since synchronization is performed with respect to one frame.

If the user requests stereoscopic 3D video frame shuttering display or stereoscopic 3D video polarized display with respect to stereoscopic 3D video in step (c), the method further includes (i) matching 3D_AU stream data with a DTS time in a sync packet header portion to restore four field images with respect to odd fields and even fields of left and right images; (ii) inserting the odd fields and even fields of the left images restored in step (i) into individual lines to perform restoring into single frame images of a progressive scanning method; and (iii) inserting odd fields and even fields of the right images restored in step (i) into individual lines to perform restoring into single frame images of a progressive scanning method, after which decoding is performed into data of two composition units.

In the above, the time information of 3D_AU stream data, in the case of a stereoscopic 3D video shuttering display method, uses a CTS with respect to one image among left and right images since left and right images appear alternately to thereby estimate CTSs of remaining images by a time correlation between the left images and right images.

If the CTS is an effective time with respect to data (CU1) of a first composition unit format, an effective time with respect to data (CU2) of a second composition unit format is CTS+T(1/number of frames per second).

With the time information of 3D_AU stream data, in the case of a stereoscopic 3D video polarized display method, has the same CTS with respect to left and right images since left and right images appear simultaneously.

If CTS is an effective time with respect to data (CU1) of a first composition unit format, an effective time with respect to data (CU2) of a second composition unit format is also CTS.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

A data processing system for stereoscopic 3-dimensional video based on MPEG-4 includes a decoding buffer 40, a decoder 50, and composition memories 61 and 65. However, since a description of the DAI and compositor was provided with reference to FIG. 1, the same description will not be provided herein to avoid repeating the same information.

Figure 4:
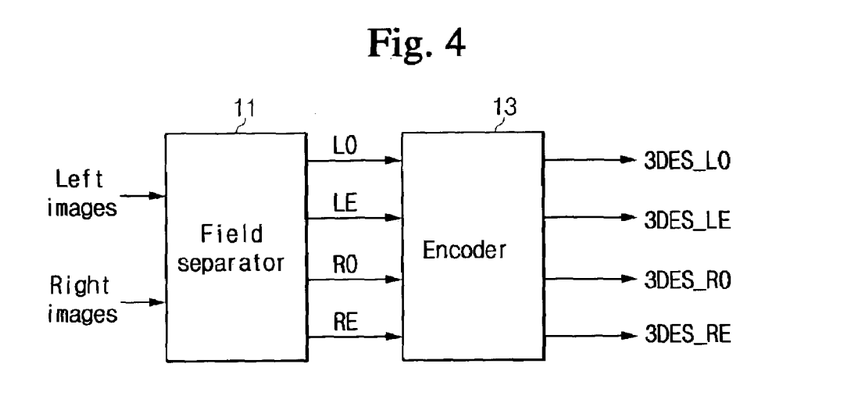
FIG. 4 is a drawing showing a structure of an encoder assembly used in a data processing system for stereoscopic 3-dimensional video based on MPEG-4 according to a preferred embodiment of the present invention.

FIG. 4 is a drawing showing a structure of an encoder assembly used in a data processing system for stereoscopic 3-dimensional video based on MPEG-4 according to a preferred embodiment of the present invention.

As shown in FIG. 4, an encoder assembly according to a preferred embodiment of the present invention includes a field separator 11 and an encoder 13. This encoder assembly performs field unit encoding that supports all display methods including 2-dimensional video display, field shuttering display of stereoscopic 3-dimensional video, frame shuttering display of stereoscopic 3-dimensional video, and stereoscopic 3-dimensional video polarized display.

In the case where stereoscopic 3-dimensional left and right images are input, the field separator 11 performs separation of left and right images into units of fields. That is, the field separator 11 performs separation of these images into odd fields LO and even fields LE of left images, and odd fields RO and even fields RE of right images.

The encoder 13 performs encoding into units of fields that are field data separated in the field separator 11, and outputs four channels of field unit elementary streams, that is, a stereoscopic 3D elementary stream_left odd field (3DES_LO), stereoscopic 3D elementary stream_left even field (3DES_LE), stereoscopic 3D elementary stream_right odd field (3DES_RO), and stereoscopic 3D elementary stream_right even field (3DES_RE).

Elementary stream data in various field units output from the encoder assembly based on fields with respect to stereoscopic 3D video vary contents of required elementary stream data according to the above four display methods.

Figure 5:
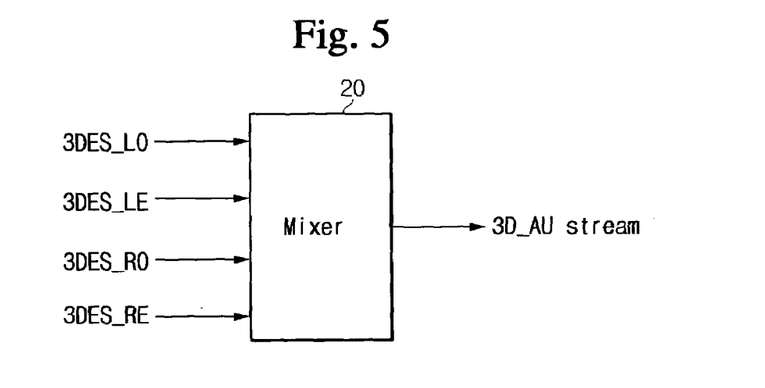
FIG. 5 is a drawing showing input and output contents of a mixer in a data processing system for stereoscopic 3-dimensional video based on MPEG-4 according to a preferred embodiment of the present invention.

Accordingly, to realize efficient transmission, a mixer 20 multiplexes only required elementary streams with respect to each display method.

FIG. 5 is a drawing showing input and output contents of a mixer in a data processing system for stereoscopic 3-dimensional video based on MPEG-4 according to a preferred embodiment of the present invention.

As shown in the drawing, with the input of various elementary streams in units of fields according to the four display methods, the mixer 20 performs multiplexing of the elementary streams to output a 3D_access unit (3D_AU) stream of a single channel.

Figure 6:
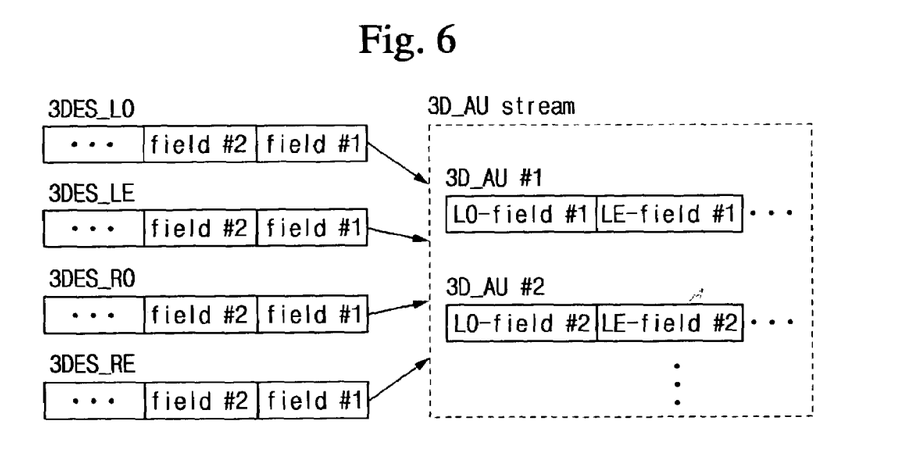
FIGS. 6 through 8 show a multiplexing process of a field unit elementary stream of stereoscopic 3-dimensional video for display that is able to use a data processing system for stereoscopic 3-dimensional video based on MPEG-4 according to a preferred embodiment of the present invention, that is, 2-dimensional video display, stereoscopic 3-dimensional video field shuttering display, and stereoscopic 3-dimensional video frame and polarized display.
Figure 7:
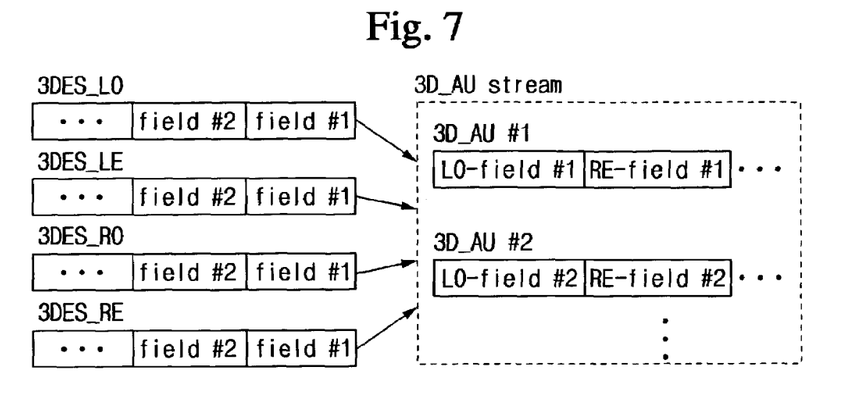
Figure 8:
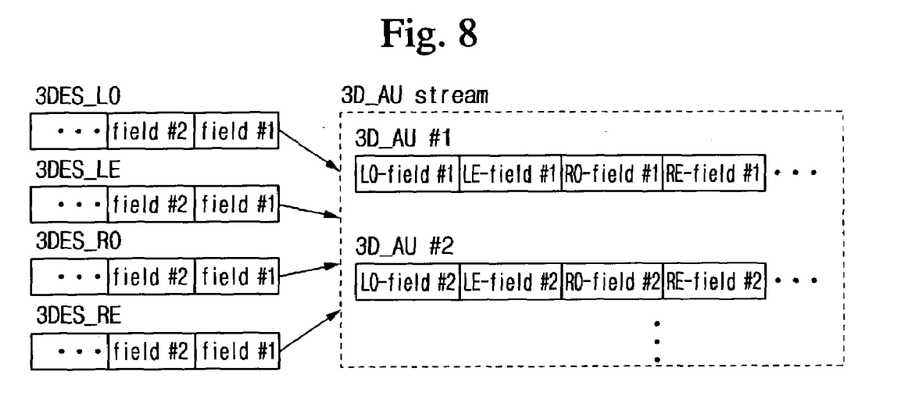

FIGS. 6 through 8 show a multiplexing process of a field unit elementary stream of stereoscopic 3-dimensional video for display able to use a data processing system for stereoscopic 3-dimensional video based on MPEG-4 according to a preferred embodiment of the present invention.

When a user desires 2D video display with respect to stereoscopic 3D video, the mixer 20 consecutively integrates 3DES_LO and 3DES_LE to realize a 3D_AU stream of a single channel as shown in FIG. 6.

When the user desires stereoscopic 3D video field shuttering display with respect to stereoscopic 3D video, the mixer 20 consecutively integrates 3DES_LO and 3DES_RE to realize a 3D_AU stream of a single channel as shown in FIG. 7.

Further, when the user desires stereoscopic 3D video frame shuttering and polarized display with respect to stereoscopic 3D video, the mixer 20 consecutively integrates 3DES_LO, 3DES_LE, 3DES_RO, and 3DES_RE to realize a 3D_AU stream of a single channel as shown in FIG. 8.

In the above, the 3D_AU stream of a single channel is packetized in a sync layer and transmitted in an SPS format. SPS (SL_packetized stream) is structured including a succession of packets, each including one elementary stream. That is, each packet includes elementary stream data divided into access units (AUs), and timing and other information with respect to each AU.

Figure 9:
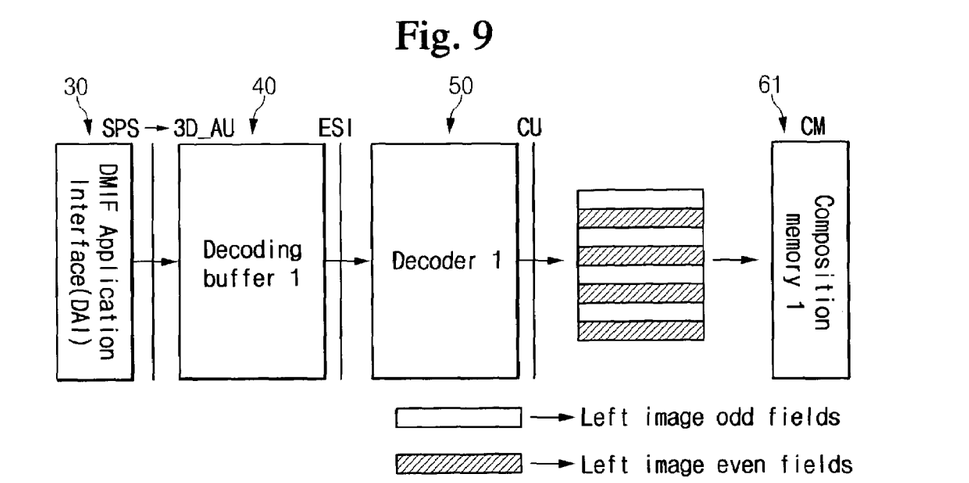
FIGS. 9 through 11 show a decoding structure of stereoscopic 3-dimensional video for display that is able to use a data processing system for stereoscopic 3-dimensional video based on MPEG-4 according to a preferred embodiment of the present invention, that is, 2-dimensional video display, stereoscopic 3-dimensional video field shuttering display, and stereoscopic 3-dimensional video frame and polarized display.
Figure 10:
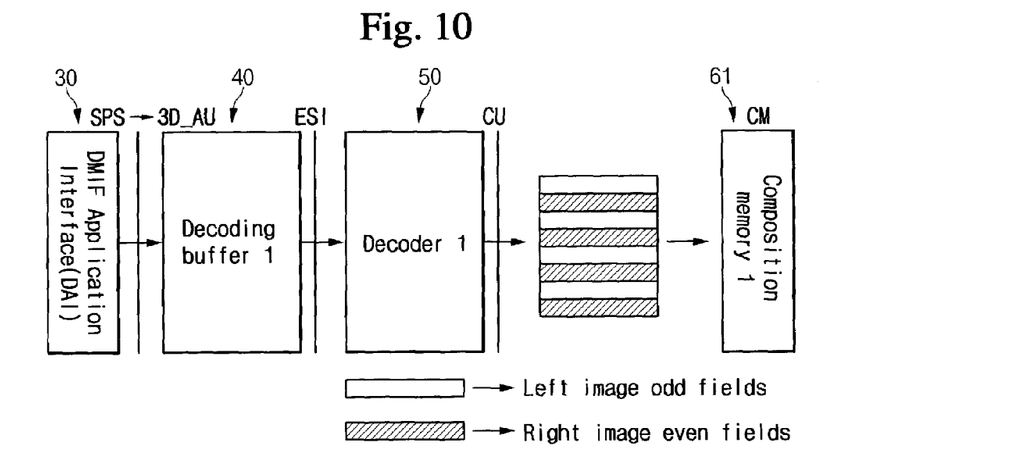
Figure 11:
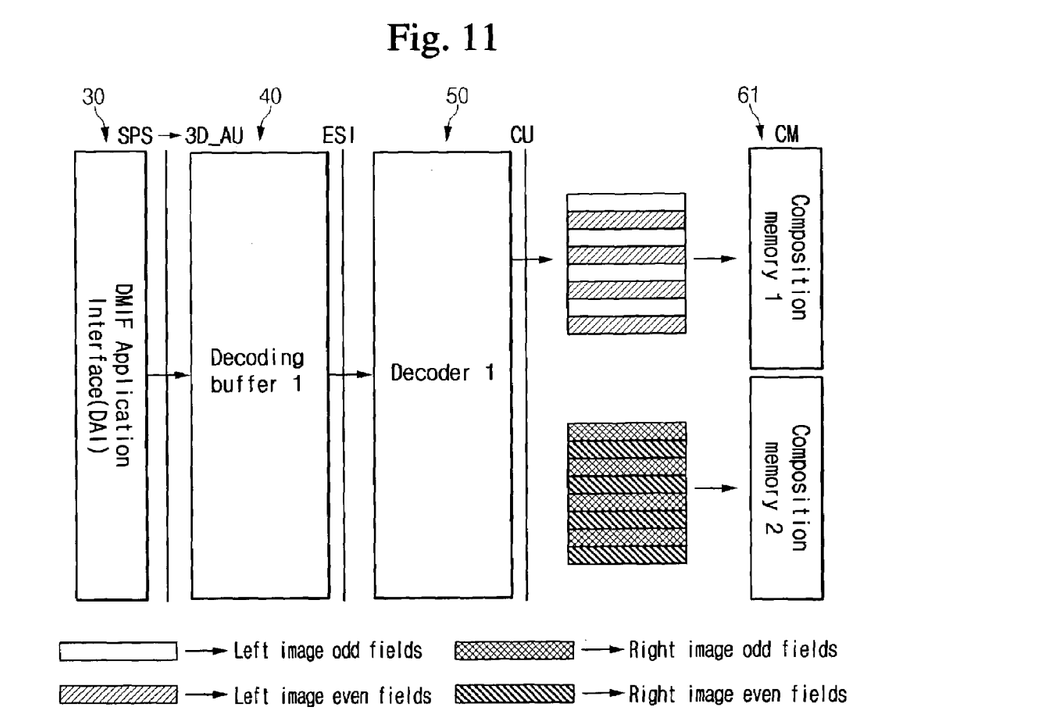

FIGS. 9 through 11 show a decoding structure of stereoscopic 3-dimensional video for display able to use a data processing system for stereoscopic 3-dimensional video based on MPEG-4 according to a preferred embodiment of the present invention.

Referring first to FIG. 9, in a decoding structure with respect to a 2D video display method, 3D_AUs are stored in the decoding buffer1 40, and LO and LE field images are restored in the decoder1 50 matching a DTS time in a sync pack header portion and corresponding to the decoding buffer1 40.

The images restored in this manner are re-structured into single frame images of a progressive scanning method by inserting the LO and LE fields into individual lines, and are input to the composition memory1 61 in a single composition unit format.

Referring to FIG. 10, in a decoding structure with respect to a stereoscopic 3D video field shuttering display method, 3D_AUs are stored in the decoding buffer1 40, and LO and LE field images are restored in the decoder1 50 matching a DTS time.

Further, the decoder1 50 inserts the LO and RE fields into individual lines, and inputs left and right field images into the composition memory1 61 in a re-structured single composition unit format of a progressive scanning method.

Referring to FIG. 11, in a decoding structure with respect to a stereoscopic 3D video frame shuttering and polarized display method, 3D_AUs are stored in the decoding buffer1 40, and four field images of left and right images are restored while matching a DTS time.

Further, the decoder1 50 inserts the left and right LO and RE fields into individual lines to perform restoration as single frame images of a progressive scanning method, and inserts right image RO and RE fields into individual lines to perform restoration as single frame images of a progressive scanning method. The decoder1 50 then performs input to the composition memory1 61 and composition memory2 65 in two composition unit formats.

FIGS. 12 through 15 show buffer and timing management according to a display method by a data processing system for stereoscopic 3-dimensional video based on MPEG-4 according to a preferred embodiment of the present invention.

Figure 12:
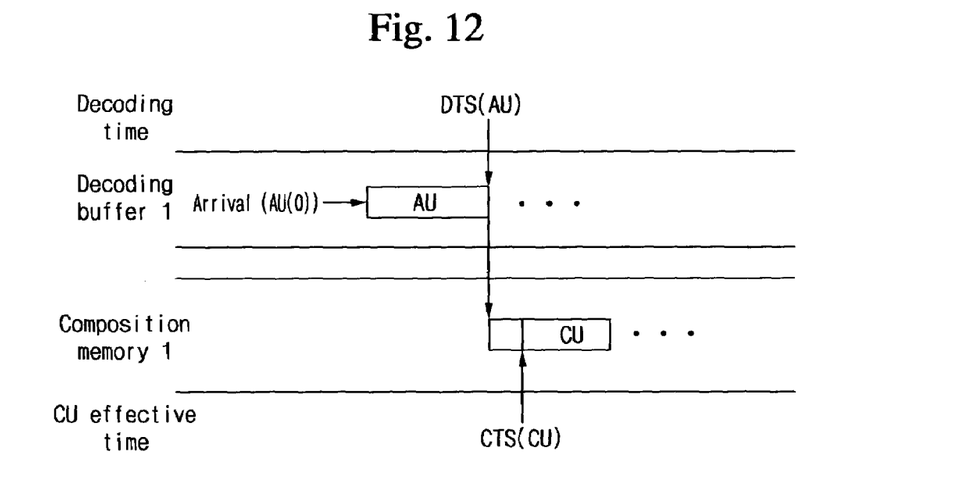
FIGS. 12 through 15 show buffer and timing management according to display method by a data processing system for stereoscopic 3-dimensional video based on MPEG-4 according to a preferred embodiment of the present invention.

With reference first to FIG. 12, in the 2D video display method, following decoding in DTS time of 3D_AUs stored in the decoding buffer 40, LO and LE fields are re-structured in a single frame and input to the composition memory 61 in a single composition unit format.

Accordingly, since the CTS performs synchronization with respect to one frame in the left and right frames, there is only one CTS in the 3D-AU time information.

Figure 13:
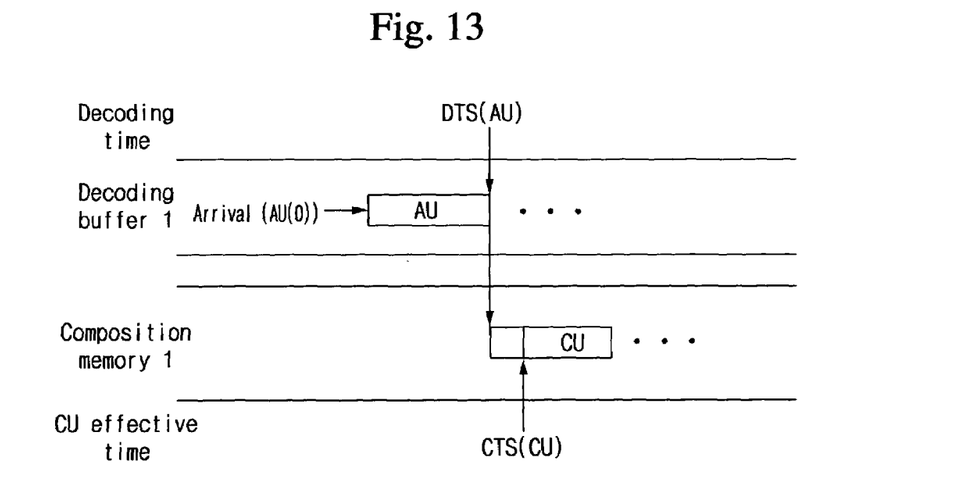

As shown in FIG. 13, in the stereoscopic 3D video field shuttering display method, when CTS re-structures LO and RE fields into one frame, since synchronization is performed with respect to one frame, there is the same CTS with respect to left and right field images in the 3D_AU time information.

Figure 14:
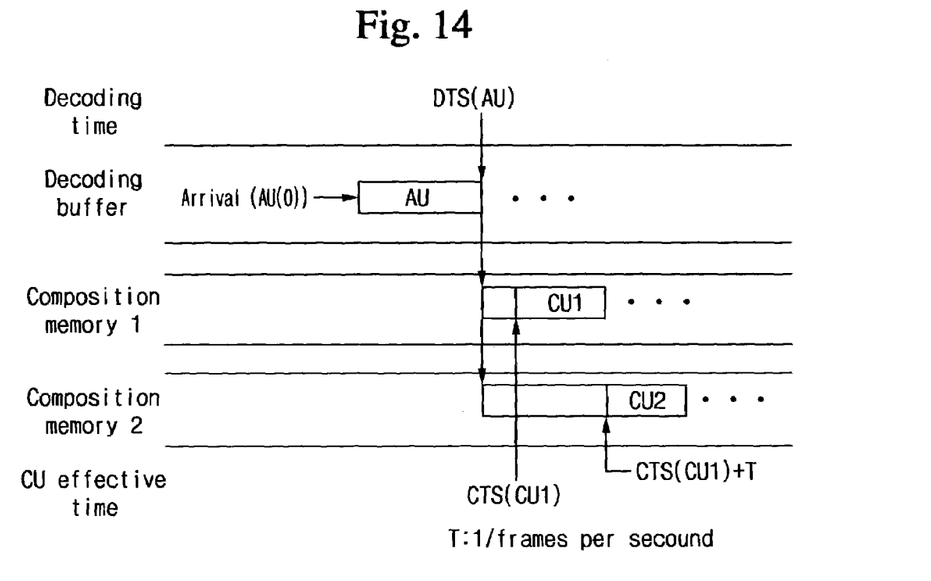

Next, with reference to FIG. 14, in the stereoscopic 3D video frame shuttering display method, 3D_AU re-structures two fields of left images into a single frame and two fields of right images into a single frame, then performs input respectively into the composition memory1 61 and composition memory2 65 in a composition unit format.

In stereoscopic 3D video frame shuttering display of the above, left and right images appear alternately. As a result, CTS information in 3D_AU time information is such that, using a time correlation between left images and right images, a right image CTS may be known if a CTS of a left image is known, and, similarly, a left image CTS may be known if a CTS of a right image is known.

As shown in FIG. 14, if an effective time of a composition unit1 CU1 is a CTS, then an effective time of a composition unit2 CU2 is CTS+T, where T is 1/number of frames per second. Information of the number of frames per second must be sent to a receiving end from a transmission end.

Figure 15:
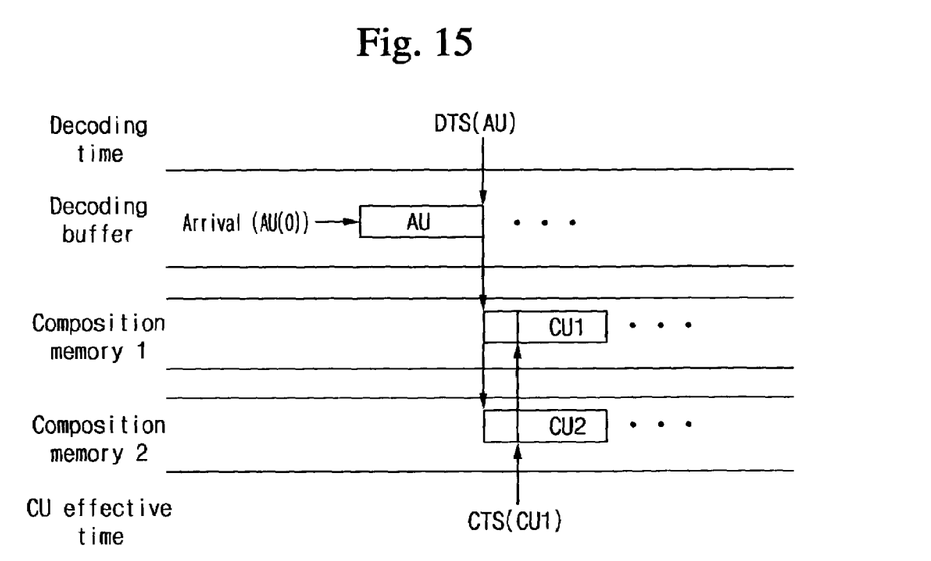

With reference to FIG. 15, in the stereoscopic 3D video polarized display method, 3D_AUs re-structure two fields of left images into a single frame and two fields of right images into a single frame, then perform input respectively into the composition memory1 61 and composition memory2 65 in a composition unit format, identically as in stereoscopic 3D video frame shuttering display.

In this case, left and right images appear simultaneously so that CTS information in 3D_AU time information is such that left images and right images have the same CTS. Accordingly, if an effective time with respect to CU1 is CTS, an effective time of CU2 also becomes CTS.

An operation of the data processing system for stereoscopic 3D video based on MPEG-4 structured as in the above will now be described.

In present MPEG-4 systems, AUs are the smallest access units that can provide time synchronization, and are divided into various sync packets and transmitted. Such sync packets have the same DTS and undergo decoding in the decoder 50.

In the encoder assembly, elementary streams encoded into field units are multiplexed in the mixer 20 into 3D_AU stream data with different contents depending on the display method. Such multiplexed 3D_AU stream data are divided into sync packets and stored following transmission to the decoding buffer 40. In the decoder 50, the 3D_AU stream data stored in the decoding buffer 40 are restored as left and right image data through STS, and fields with respect to left and right images are restructured as data in a single frame composition unit CU format, then transmitted to the composition memories 61 and 65.

However, with the 3D_AU stream data that is multiplexed with different information according to the four display methods, since single DTS and CTS information with respect to AUs of a single channel are transmitted, the DTS and CTS with respect to the remaining channels are differently generated according to each display method.

Accordingly, the decoding buffer 40 must be of a size that can store 3D_AUs corresponding to 3D frame shuttering and polarized display methods.

The composition memories 61 and 65 store data in a composition unit format transmitted from the decoder 50, and the compositor receives data in the form of composition units from the composition memories 61 and 65. If this data is AV data, composition is performed in CTS, while a skip operation is performed if it is not AV data.

As a result, in the preferred embodiment of the present invention, with respect to 3D_AUs, which are structured by all display methods that can be used, time information obtained from elementary streams of one channel is synchronized with elementary streams of the remaining channels to perform buffer and timing management for stereoscopic 3D video processing while maintaining compatibility with conventional MPEG-4 systems.

In the data processing system for stereoscopic 3D video based on MPEG-4 of the present invention, various elementary streams with respect to left and right images of stereoscopic 3D video are multiplexed into a single stream, and efficient buffer management is performed through field encoding that supports all possible display methods. The system also minimizes the synchronization time of left and right images and reduces the complexity of the decoder model.

Further, in the data processing system for stereoscopic 3D video based on MPEG-4 of the present invention, the decoding buffer size is allocated to enable support of stereoscopic 3D video field/frame shuttering and stereoscopic 3D video polarized display, while maintaining compatibility with conventional 2D video data processing.

Finally, in the data processing system for stereoscopic 3D video based on MPEG-4 of the present invention, only DTS and CTS, which are time information obtained from a single channel elementary stream among the various elementary streams with respect to left and right images, are transmitted at the same time, and DTS and CTS of the remaining times are estimated to thereby simplify synchronization.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A data processing system for stereoscopic 3-dimensional video based on MPEG-4, comprising:
   a decoding buffer which, if external stereoscopic 3-dimensional video are input, performs multiplexing of only elementary streams required for a desired display method from among various display methods such as a 2-dimensional video display method, a stereoscopic 3-dimensional video field shuttering display method, a stereoscopic 3-dimensional video frame shuttering display method, and a stereoscopic 3-dimensional video polarized display method, and storing stream data of 3-dimensional access units (3D_AUs) of a single channel;
   a decoder for decoding the stream data stored in the decoding buffer at decoding times designated with respect to each access unit (AU), and transporting the fields of left and right images following re-structuring as data in a single frame composition unit (CU) format; and
   composition memory storing the data of the composition unit format transmitted to the decoder.

2. The system of claim 1, wherein the 3-dimensional access unit (3D_AU) stream data are formed of consecutive sync packets including a single elementary stream, and a sync packet header portion includes time information of a DTS (decoding time stamp) and a CTS (composition time stamp) with respect to AUs of a single channel according to the display method.

3. The system of claim 2, wherein the time information of 3D_AU stream data has one CTS as a result of performing synchronization with respect to one frame among left and right frame images.

4. The system of claim 1, wherein the decoding buffer, for 2D video display, stores stream data of 3D_AU formed of elementary streams with respect to odd and even fields of left images.

5. The system of claim 1, wherein the decoding buffer, for 3D video field shuttering display, stores stream data of 3D_AU formed of elementary streams with respect to odd fields of left images and even fields of right images, and of elementary streams with respect to even fields of left images and odd fields of right images.

6. The system of claim 1, wherein the decoding buffer, for 3D video frame shuttering display and stereoscopic 3D video polarized display, stores stream data of 3D_AU formed of odd and even fields of left images and odd and even fields of right images.

7. The system of claim 1, wherein the composition memory, for 2D video display, stores images that include odd and even fields of left images restored by the decoder and inserted into individual lines.

8. The system of claim 1, wherein the composition memory, for stereoscopic 3D video field shuttering display, stores images of a mixture of left and right images by inserting into individual lines odd fields of restored left images and even fields of right images, and even fields of left images and odd fields of right images.

9. The system of claim 1, wherein the composition memory, for stereoscopic 3D video frame shuttering display or stereoscopic 3D video polarized display, stores images including odd and even fields of left images inserted into individual lines, and images including odd and even fields of right images inserted into individual lines.

10. A data processing method for stereoscopic 3-dimensional video based on MPEG-4, comprising:
    (a) performing multiplexing, in the case where external stereoscopic 3 dimensional video are input, of only elementary streams required for a desired display method from among various display methods such as a 2-dimensional video display method, a stereoscopic 3-dimensional video field shuttering display method, a stereoscopic 3-dimensional video frame shuttering display method, and a stereoscopic 3-dimensional video polarized display method, and storing stream data of 3-dimensional access units (3D_AUs) of a single channel;
    (b) decoding the stream data stored in (a) at decoding times designated with respect to each access unit (AU), and transporting the fields of left and right images following re-structuring as data in a single frame composition unit (CU) format; and
    (c) storing the data of the composition unit format transmitted in (b).

11. The method of claim 10, wherein the 3-dimensional access unit (3D_AU) stream data in (b) are formed of consecutive sync packets including a single elementary stream, and a sync packet header portion includes time information of a DTS (decoding time stamp) and a CTS (composition time stamp) with respect to AUs of a single channel according to the display method.

12. The method of claim 11, wherein the time information of 3D_AU stream data has one CTS as a result of performing synchronization with respect to one frame among left and right frame images.

13. The method of claim 10, wherein if the user requests 2D video display with respect to stereoscopic 3D video data in step (b), only an odd field elementary stream of 3D left images and an even field elementary stream of 3D left images output in step (a) are consecutively combined to realize stream data of 3D_AU of a single channel.

14. The method of claim 10, wherein if the user requests stereoscopic 3D video field shuttering display with respect to stereoscopic 3D video in step (b), only an odd field elementary stream of 3D left images and an even field elementary stream of 3D right images output in step (a) are consecutively combined to realize stream data of 3D_AU of a single channel.

15. The method of claim 10, wherein if the user requests stereoscopic 3D video frame shuttering display or stereoscopic 3D video polarized display with respect to stereoscopic 3D video in step (b), only an odd field and even field elementary stream of 3D left images, and an odd field and even field elementary stream of 3D right images output in step (a) are consecutively combined to realize stream data of 3D_AU of a single channel.

16. The method of claim 10, wherein if the user requests 2D video display with respect to stereoscopic 3D video in step (c), the method further comprises:
    (i) matching 3D_AU stream data with a DTS time in a sync packet header portion to restore odd fields and even fields of left images; and
    (ii) inserting the odd fields and even fields of left images restored in step (i) into individual lines to perform decoding into data of composition units restored into single frame images of a progressive scanning method.

17. The method of claim 10, wherein if the user requests stereoscopic 3D video field shuttering display with respect to stereoscopic 3D video in step (c), the method further comprises:
    (i) matching 3D_AU stream data with a DTS time in a sync packet header portion to restore odd fields of left images and even fields of right images; and
    (ii) inserting the odd fields of left images and even fields of right images restored in step (i) into individual lines to perform decoding into data of composition units restored into single frame images of a progressive scanning method.

18. The method of claim 17, wherein time information of 3D_AU stream data has the same CTS with respect to left and right field images since synchronization is performed with respect to one frame.

19. The method of claim 10, wherein if the user requests stereoscopic 3D video frame shuttering display or stereoscopic 3D video polarized display with respect to stereoscopic 3D video data in step (c), the method further comprises:
    (i) matching 3D_AU stream data with a DTS time in a sync packet header portion to restore four field images with respect to odd fields and even fields of left and right images;
    (ii) inserting the odd fields and even fields of the left images restored in step (i) into individual lines to perform restoring into single frame images of a progressive scanning method; and
    (iii) inserting odd fields and even fields of the right images restored in step (i) into individual lines to perform restoring into single frame images of a progressive scanning method, after which decoding is performed into data of two composition units.

20. The method of claim 19, wherein a time information of 3D_AU stream data, in the case of a stereoscopic 3D video frame shuttering display method, uses a CTS with respect to one image among left and right images since left and right images appear alternately to thereby estimate CTSs of remaining images by a time correlation between the left images and right images.

21. The method of claim 20, wherein if the CTS is an effective time with respect to data (CU1) of a first composition unit format, an effective time with respect to data (CU2) of a second composition unit format is CTS+T(1/number of frames per second).

22. The method of claim 19, wherein with the time information of 3D_AU stream data, in the case of a stereoscopic 3D video polarized display method, has the same CTS with respect to left and right images since left and right images appear simultaneously.

23. The method of claim 22, wherein if CTS is an effective time with respect to data (CU1) of a first composition unit format, an effective time with respect to data (CU2) of a second composition unit format is also CTS.

* * * * *